Figure 1:
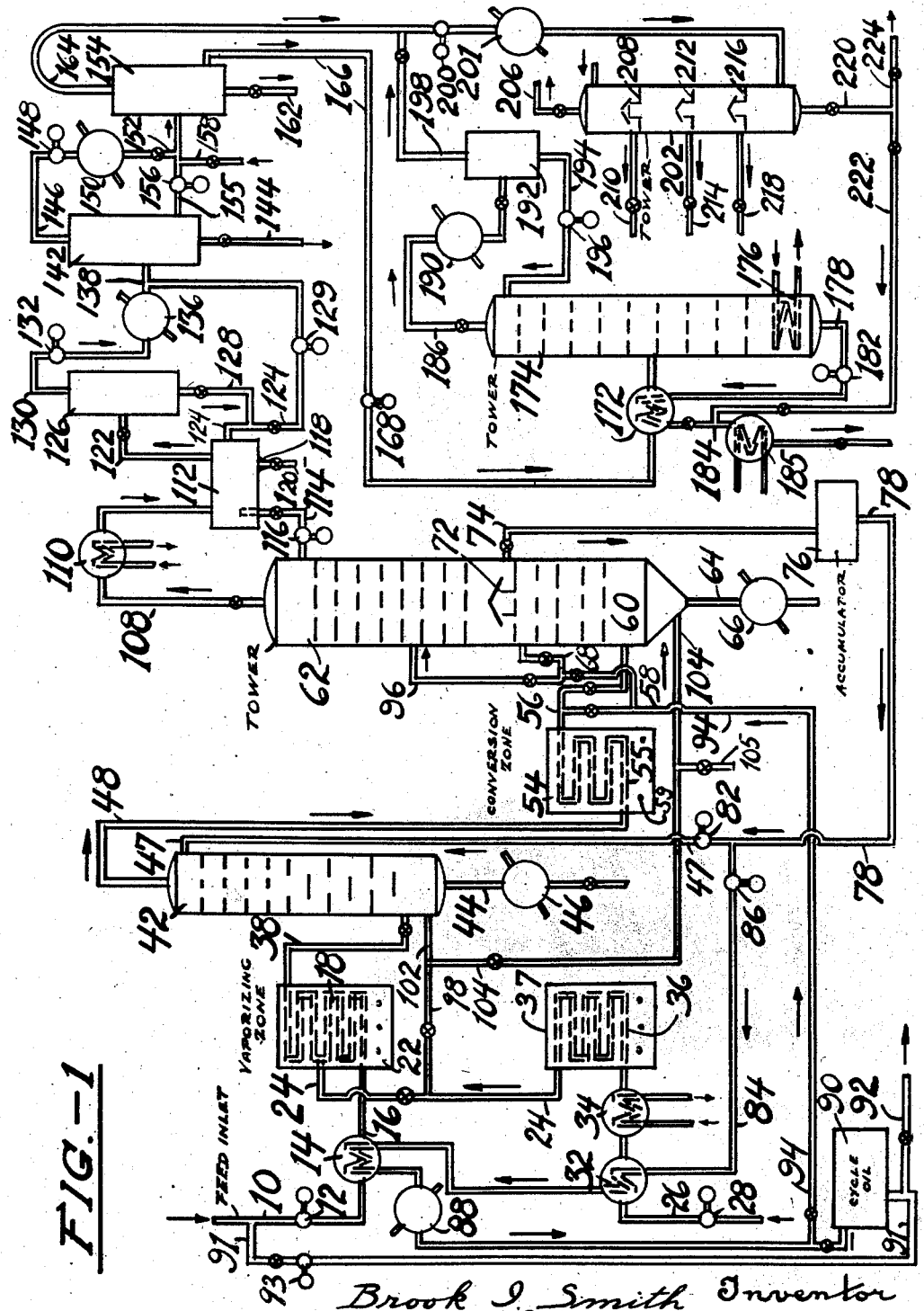

Patented Nov. 28, 1944

2,363,903

UNITED STATES PATENT OFFICE 2,363,903

TREATING HYDROCARBON FLUIDS

Brook I. Smith, Elizabeth, N. J., assignor to Standard Oil Development Company, a corporation of Delaware Application January 2, 1941, Serial No. 372,853

2 Claims. (Cl. 260—668)

This invention relates to the thermal conversion of relatively heavy hydrocarbons to form unsaturated lower boiling hydrocarbons.

According to this invention, relatively heavy hydrocarbon oils such as gas oil or the like are heated to a relatively high temperature in the presence of steam and under a relatively low pressure to convert a relatively large portion thereof to lower boiling unsaturated hydrocarbons such as ethylene, propylene, butylene, butadiene, and the like. This invention is primarily concerned with the production of ethylene which may be used as a starting product in the manufacture of other chemical compounds. The conversion takes place at a relatively high temperature and during the conversion, gasoline constituents are also formed which are mostly aromatic in character so that an aromatic gasoline is also recovered as one of the products. However, the invention is so carried out that the largest percentage of ethylene is obtained without serious deposition of coke in the conversion zone.

More specifically, the invention includes heating a relatively heavy oil to a vaporizing temperature and in the presence of steam and then passing the heated relatively heavy oil to a separating zone to separate unvaporized constituents from hydrocarbon vapors. The hydrocarbon vapors and the steam are passed through a conversion zone where the hydrocarbon vapors are heated to a relatively high temperature to effect the desired extent of conversion and the production of a relatively large amount of ethylene. The products of conversion leaving the conversion zone are quenched with a relatively cool cycle gas oil and the quenched mixture is introduced into the lower portion of a fractionating tower to separate liquid residue from vapors. The separated vapors are fractionated to separate a cycle gas oil and tar from volatile constituents passing overhead from the fractionating tower.

The overhead vapors are cooled to condense normally liquid constituents and water. The water is withdrawn from a separator as the lower layer. The normally liquid constituents or distillate is withdrawn as the upper layer. The uncondensed vapors are passed into a knock-out drum to separate any liquid constituents therefrom. The uncondensed vapors are then passed through a first stage compressor to raise the pressure on the vapors and the compressed vapors are cooled under pressure, and with the distillate introduced into an intermediate knock-out drum for separating condensed constituents such as water as the lower layer. In this drum uncondensed vapors are separated from distillate and compressed in a second stage compressor and again cooled before being introduced into a collecting drum. The distillate is withdrawn from the intermediate knock-out drum as an upper layer, also has its pressure increased and is then introduced into the collecting drum.

The distillate from the collecting drum is passed to a fractionating tower where volatile constituents are removed from normally liquid hydrocarbons which are withdrawn from the bottom of the tower as an aromatic fraction suitable for use in motor fuels.

The vapors passing overhead from the last mentioned fractionating tower are mixed with uncondensed vapors from the collecting drum above described and the combined vapors are then treated in any suitable manner as by a series of fractionating towers to separate a light fraction containing methane and ethylene, another fraction comprising mostly ethylene, another fraction containing mostly propylene, another fraction containing butylenes and butadiene and a final fraction containing light aromatic constituents suitable for use in motor fuels. The first fraction containing methane and ethylene may be used as such without the removal of methane in a chemical process for reacting the ethylene with any desired reagent. For example, this fraction may be used in the manufacture of ethyl chloride without removing the methane from the mixture. The light aromatic constituents are preferably combined with the separated aromatic distillate above described. The $C_4$ fraction is preferably treated in any suitable manner to separate butadiene from the butylenes.

As above stated, any suitable fractionation system may be used for separating the desired fractions from the vapors and gases. A fractionation process especially adapted for separating these fractions is disclosed and claimed in a separate copending application filed for Smith et al., the application bearing Serial No. 372,854 and having a filing date of January 2, 1941.

Figure 2:
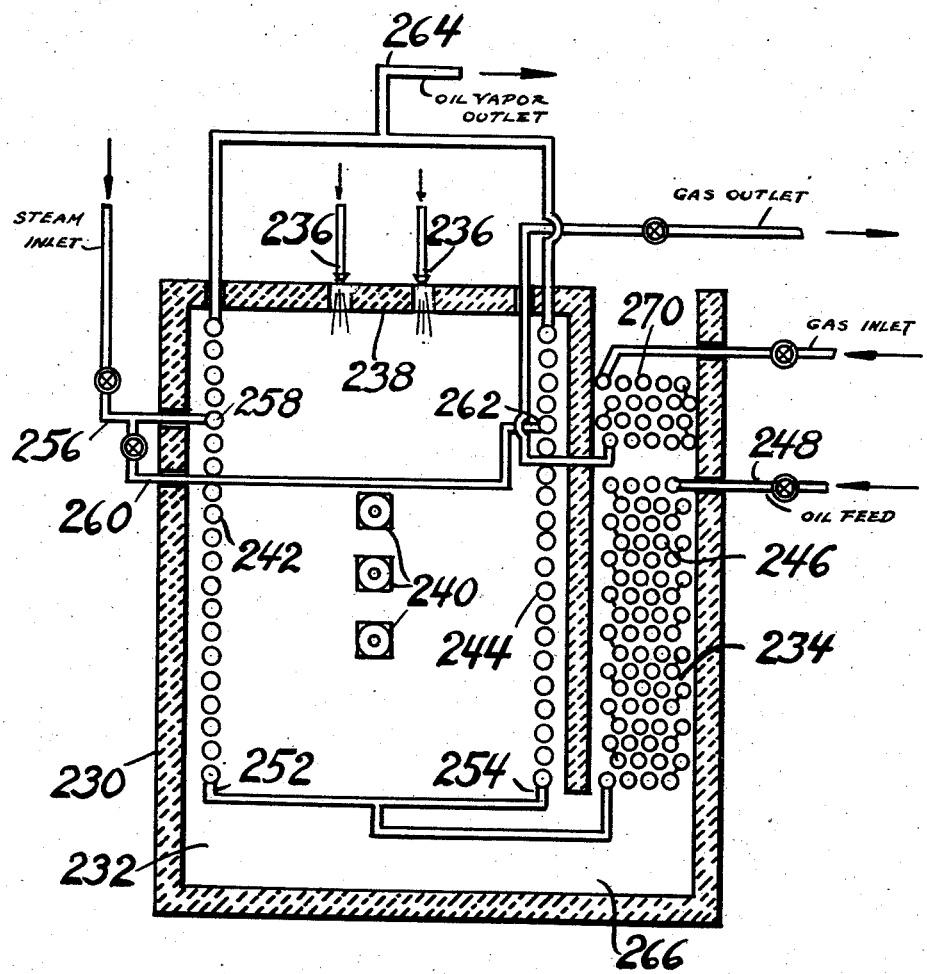

In the drawings:

Figure 1 represents a diagrammatic showing of apparatus adapted to carry out the process of this invention; and Figure 2 represents a vertical cross section taken through a box-type furnace adapted to vaporize the hydrocarbon feed.

Referring now to the drawings, the reference character 10 designates a line through which a relatively heavy oil such as gas oil, or the like is passed by means of pump 12. The relatively heavy oil is preheated by passing through a heat exchanger 14 where it indirectly contacts hot cycle gas oil separated later in the process as will be hereinafter described. If desired, the preheated feed oil may be passed to an accumulator. The preheated relatively heavy oil is passed through line 16 and through a heating coil 18 in the furnace 22 to vaporize a large portion of the relatively heavy hydrocarbon oil under tempertaure conditions at which substantially no cracking occurs. Superheated steam passing through line 24 is injected into the latter passes of the heating coil 18.

The heating of the water to provide the superheated steam will now be described. Water passing through line 26 is forced by means of pump 28 through a heat exchanger 32 where it indirectly contacts hot cycle gas oil for preheating the water. The preheated water is then passed through a heat exchanger or heating means 34 where it is vaporized by indirectly contacting a hot circulating oil. The steam is then passed through a heating coil 36 shown in the drawings as being in a furnace 37 where the steam is superheated and the superheated steam or a portion thereof is passed through line 24 into the vaporizing coil 18 as above described. The heating coil 36 is preferably located in the conversion furnace later to be described.

The vaporizing furnace 22 is shown diagrammatically in Figure 1 in order to simplify the showing in the drawings. In Figure 2 there is shown the structure for a vaporizing furnace which is preferably used for vaporizing the heavy oil. The construction or apparatus shown in Figure 2 will be more specifically described hereinafter.

The heated relatively heavy hydrocarbon oil and steam leave the vaporizing coil 18 through line 38 and are introduced into the lower portion of a separating and fractionating tower 42 for separating unvaporized constituents from hydrocarbon vapors. The unvaporized constituents collect on the bottom of the fractionating tower 42 from which they are withdrawn through line 44. The unvaporized constituents which may comprise 10% to 30% by weight of the feed oil are passed through a cooler 46 and then to storage or otherwise disposed of. The separated vapors at an elevated temperature leave the top of the fractionating tower 42 through line 48 and are then passed through a heating zone of low heat input or drying zone immediately on entering the cracking furnace such as the convection section to allow time for coking of liquid particles which may be carried over from the first separating zone. The convection preheating section in furnace 54 may be referred to as the vapor feed drying zone. The dried vapors are then passed through the radiant and soaker sections comprising the conversion zone. The conversion coil 55 is diagrammatically shown on the drawings.

During passage through the conversion coil 55, the hydrocarbon vapors are rapidly heated to a relatively high temperature and are maintained in the coil for a sufficient period of time to effect the desired extent of conversion and the production of an appreciable amount of unsaturated lower boiling hydrocarbons such as ethylene and butadiene.

During fractionation of the vapors in the fractionating tower 42, cycle gas oil recovered from a later stage in the process is preferably introduced into the upper portion of the fractionating tower 42 as reflux to assist in removing higher boiling hydrocarbons from the vapors. The cycle oil is introduced into the tower 42 through line 47.

The furnace or heater 54 is diagrammatically shown in the drawings in order to simplify the drawings and to facilitate understanding of the invention. A furnace or heater especially adapted for heating hydrocarbon vapors to conversion temperatures, for superheating the steam, for heating the circulating oil stream, for preheating the oil vapors to be cracked and for soaking the hydrocarbon oil vapors at conversion temperature is shown in copending application filed for Smith et al. on January 2, 1941, and bearing Serial No. 372,855.

The furnace which is shown in the other application and which is especially designed for this process will now be briefly described. Preferably, two radiant sections and a common convection section are provided. Burners are provided at the top of the radiant heating sections and at the ends of the radiant heating sections and combustion gases are withdrawn from the bottom of the radiant heating section and introduced to the common convection section. Oil vapors and steam from the fractionator 42 are passed through a cooler part of the convection heating section in four separate streams to preheat and dry the vapors as above described. The separate streams are then each passed through a single row of wall tubes in the radiant heating sections to heat the streams to conversion temperature. Each radiant section has two rows of wall tubes and the separate streams are separately heated in the radiant sections.

The separate streams of oil vapors as they leave the radiant sections are at conversion temperature and each stream is separately passed through a soaking section in which the oil vapors are maintained at conversion temperature for the required period of time. The soaking section may be in one section but it is preferably divided into two portions and each portion is located in the hottest portion of the convection section. In the specific construction the soaking section is divided into two portions corresponding to the two radiant sections and the soaking tubes are arranged in the upper part of the passageway forming part of the convection section, the remaining unobstructed lower part of the passageway being provided with a damper for controlling the heating of the soaking tubes. From the soaking tubes, the separate streams are combined and passed through transfer line 56 as shown in the drawings. Preferably the stream from each soaker section is passed as a separate stream to the tower 62.

For preventing overheating of the oil vapors in the soaking sections, the steam superheater shown at 59 in the drawings is arranged in the hottest portions of the convection section ahead of the soaking tubes or sections in the furnace 54. Arranged in the coolest part of the convection section of the furnace 54 and above the preheating section above described is arranged the coil for heating the oil stream which is circulated through heat exchanger 34 and for providing heat in other steps in the process as will be hereinafter described.

From the above, it will be seen that the heating of a plurality of streams is brought about in a single furnace and in this way better and more efficient heating is effected.

The products of conversion leave the conversion coil 55 at an elevated temperature and in order to prevent undue cracking, quench oil is introduced into the products of conversion by means of line 58 to reduce the temperature of the products of conversion. Coke deposition in the transfer line 56 and second separating zone 60 is avoided by quenching the reaction products to a temperature above the point at which condensation of the reaction products will occur. The quench oil comprises a portion of the cooled cycle gas oil above referred to which is recovered in the later steps of this process and will be described hereinafter.

The quenched products of conversion are introduced into the lower portion or separating zone 60 of a fractionating tower 62 where a liquid residue is separated from desired vaporous constituents. The sensible and latent heat remaining in the reaction products after quench is used for the distillation of aromatic gasoline and light hydrocarbons from cycle oil and tar in the fractionating tower 62. A heavy liquid residue or tar is withdrawn from the bottom of the fractionator 62 through line 64 and is cooled in passing through the cooler 66 before being passed to storage or disposed of otherwise.

The vapors passing upwardly through fractionating tower 62 are fractionated to separate heavier constituents from lighter constituents. To assist in the fractionation and to remove heavier constituents from the vapors, reflux oil is introduced into the lower portion 60 of the fractionating tower 62 by means of line 68 below the trap-out tray 72. The reflux oil is preferably a portion of the cooled cycle gas oil which is used as quench in line 58 above described.

Relatively heavy hydrocarbons collect on the trap-out tray 72 from which they are drawn by means of line 74 and introduced into an accumulator 76. The relatively heavy hydrocarbons withdrawn from trap-out tray 72 form the cycle oil which has been above referred to. The cycle oil collecting in the accumulator 76 is withdrawn therefrom and passed through line 78 by means of pump 82 and a portion thereof is introduced into the upper portion of the fractionating tower 42 by means of line 47 as above described. Another portion of the cycle oil is passed through line 84 by means of a pump 86, if necessary, the hot cycle oil passing through line 84 being passed through heat exchanger 32 for preheating the water to be used in the process and then through heat excahnger 14 for preheating the relatively heavy hydrocarbon feed oil passing through line 10. In passing through these heat exchangers the cycle oil is cooled. The cycle oil is then preferably further cooled by passing through a water cooler 88 or the like and a portion of the cooled oil may be passed to an accumulator 90. The cycle gas oil is withdrawn from accumulator 90 through line 91 and may be withdrawn from the process through valved line 92 or it may be passed through line 91 by pump 93 and recycled to and mixed with the fresh feed passing through line 10.

Preferably, a portion of the cooled cycle oil is passed through line 94 and used as quench oil and refluxing medium. A portion of the cooled cycle oil is passed through line 58 as quench and through line 68 as refluxing medium as above described. Another portion of the cooled cycle oil is preferably passed through line 96 and introduced into the intermediate portion of the fractionating tower 62 above the trap-out tray 72 as refluxing medium to assist in the fractionation of the vapors in the tower 62.

Steam is directly introduced into the bottom portion of fractionating tower 42 and if necessary may be introduced into the bottom portion of tower 62 to assist in removing volatile constituents from the heavy hydrocarbons accumulating in the bottom portions of these fractionators. Steam for this purpose is taken from the stream of superheated steam leaving the superheating coil 36 above described. A portion of the superheated steam and preferably about 50% of the steam passing through line 24 is withdrawn therefrom, passed through lines 98 and 102 and directly introduced into the bottom portion of the fractionating tower 42. Another portion of the superheated steam passing through line 98 may be passed through line 104 and directly introduced into the bottom portion 60 of the fractionating tower 62, but preferably a separate source of steam is used for the bottom of fractionating tower 62, the steam passing through line 105.

The fractionated vapors leave the top of the fractionating tower 62 through line 108 and are cooled and condensed by being passed through condenser 110. The cooled and condensed vapors are introduced into an accumulating drum 112. Condensed hydrocarbons are withdrawn therefrom through line 114 and introduced into the upper portion of the fractionating tower 62 by means of pump 116 as reflux liquid. The drum 112 is provided with a water draw-off pot 118 from which condensed water is withdrawn from the system through line 120 and preferably discarded. Uncondensed vapors are withdrawn or pass overhead through line 122. A portion of the condensed hydrocarbons are withdrawn through line 124 to prevent building up the liquid level in drum 112.

The uncondensed vapors are introduced into a knock-out drum 126 for removing any liquid constituents which may have come over with the vapors and which are withdrawn from the bottom of the drum through valved line 128 to the intake of pump 129. The uncondensed vapors leave the top of the drum 126 through line 130 and are passed through a compressor 132 for compressing the vapors in a first stage compression. The vapors under pressure are passed through cooler 136 and introduced through line 138 into an intermediate knock-out drum 142. Likewise the liquid hydrocarbons which are withdrawn from drums 112 and 126 through lines 124 and 128 are combined and placed under pressure by pump 129 and introduced into drum 142. The cooler 136 cools the compressed vapors and condenses some of the heavier hydrocarbons and water. In this knock-out drum any condensed water collects on the bottom of the drum and may be withdrawn through valved line 144 and discarded.

The uncondensed vapors pass overhead from the drum 142 through line 146, are compressed to a higher pressure in a second stage compression by passing through the second compressor 148. The further compressed vapors are then passed through a cooler 150 and introduced into an accumulating drum 154. The cooler 150 causes condensation of additional heavier hydrocarbons and additional amounts of water. The liquid hydrocarbons are withdrawn from the drum 142 and passed through line 155 by means of pump 156 which also acts to increase the pressure on the liquid hydrocarbons. The liquid hydrocarbons under increased pressure are introduced into the accumulating drum 154. Any condensed light hydrocarbons which are separated from the vapors during cooling and before fractionation thereof may be introduced into line 155 by means of line 158.

Any condensed water collecting in the bottom of the drum 154 may be withdrawn therefrom through valved line 162. The uncondensed vapors pass overhead through line 164.

The liquid hydrocarbons are withdrawn from the accumulating drum 154 and are passed through line 166 by pump 168. The liquid hydrocarbons are then passed through a heat exchanger 172 where they are preheated and they are then introduced into an intermediate portion of another fractionating tower 174. The fractionating tower 174 is provided with a heating coil 176 in the bottom portion thereof. The heating coil 176 is heated by a circulating oil stream which forms a portion of the circulating oil stream passing through heat exchanger 34 above described, the circulating oil stream being heated in the cooler portion of the common convection heating section of the conversion furnace 54 as above described.

In the fractionating tower 174 relatively light constituents such as $C_3$, $C_4$ and some $C_5$ hydrocarbons are removed from a normally liquid fraction which is withdrawn from the bottom of the fractionating tower 174 through line 178 by means of pump 182 and is then passed through the heat exchanger 172 where the withdrawn hot liquid fraction is used to preheat the feed to the fractionating tower 174. The partially cooled withdrawn normally liquid fraction is passed through line 184 to a water cooler 185 and is then passed to storage or withdrawn from the system. This fraction withdrawn from the bottom of the tower 174 comprises an aromatic fraction which is suitable for use as a motor fuel or in motor fuels.

The vapors and gases leaving the top of the fractionating tower 174 are passed through line 186 and condenser 190 for cooling and condensing the vapors and gases. The cooled vapors and gases are introduced into a separator 192 for separating liquids from vapors and gases, the liquids being withdrawn from the bottom thereof through line 194 and introduced into the upper portion of the fractionating tower 174 as reflux liquid by means of pump 196. The uncondensed vapors pass overhead through line 198 and are combined with the vapors and gases passing through line 164 as above described and are washed with caustic soda solution or otherwise treated to remove sulfur compounds. The mixture is then preferably passed through a drying tower to remove moisture prior to subsequent low temperature fractionation operations and finally compressed in a third stage compression by passing through the third compressor 200 and cooled in cooler 201.

This compressed and cooled mixture of vapors and gases is introduced into a fractionating system or the like 202. This fractionating system 202 represents a diagrammatic showing of a means for separating desired constituents from the gaseous mixture. As above pointed out, a suitable system for separating these constituents is set forth in copending application Serial No. 372,854 above further identified and the description here given will briefly set forth the products resulting from a suitable fractionation step or steps, for example, as described in said copending case.

The vapors and gases under superatmospheric pressure and at low temperature are fractionated in the tower 202, suitable reflux and heating means being provided for the tower. The fraction passing overhead as a vapor or gas through line 206 contains hydrogen, methane, ethane and about 40% by weight of ethylene. The fraction collecting on trap-out tray 208 and withdrawn through line 210 comprises an ethylene fraction and contains about 90% ethylene. The fraction withdrawn from trap-out tray 212 by means of line 214 comprises a $C_3$ cut and contains about 70% by weight of propylene. The 90% ethylene is by weight.

The fraction collecting on trap-out tray 216 and withdrawn through line 218 comprises a $C_4$ cut containing butadiene and butylenes. The liquid hydrocarbons collecting in the bottom of the fractionating tower 202 comprise a light aromatic fraction containing gasoline constituents. This aromatic fraction is withdrawn from the bottom of the tower through lines 220 and 222 and after combining with the partially cooled aromatic fraction withdrawn from the fractionation tower 174 is further cooled in the cooler 185. If desired, the light aromatic fraction may be withdrawn as a separate fraction through line 224.

The vaporizing furnace shown in Figure 2 will now be described. The furnace 230 comprises a radiant heating section 232 and a convection heating section 234. A plurality of pairs of top burners 236 is provided, these burners extending adjacent the roof 238 of the radiant heating section for burning fuel in the upper portion of the radiant section. Burners 240 are provided in the ends of the radiant heating section for supplying additional heat to the radiant section. Single rows of wall tubes 242 and 244 are provided in the radiant section adjacent the side walls thereof.

A preheating section 246 comprising a bundle of tubes is provided in the lower portion of the convection heating section 234 for preheating the feed oil which is to be vaporized. The oil to be heated is passed through line 248 and then through the bundle of tubes 246 for preheating the hydrocarbon oil. The preheated hydrocarbon oil is then subdivided into two streams, one stream passing through line 252 and through the one row of wall tubes 242 and the other stream passing through line 254 and through the other row of wall tubes 244. In this way two streams of the oil are separately heated by radiant heat in the radiant section.

Steam superheated to a relatively high temperature is introduced into the latter portion of each row of tubes 242 and 244. Steam passing through line 256 is introduced into an intermediate tube 258 of the row 242 of heater tubes. Another stream of superheated steam is passed through line 260 into an intermediate tube 262 of the second row of heater tubes 244 in the radiant heating section. The separately heated streams of oil and steam mixtures are then combined and passed through line 264 which in Figure 1 of the drawings corresponds to line 38.

In the operation of the furnace hot combustion gases supply radiant heat to the heater tubes in the radiant heating section, the gases passing downwardly and through outlet 266 and then upwardly through the convection section 234 where heat is supplied to the preheating tubes 246 by convection. Heater tubes for heating other streams of fluids may be provided in the cooler portion of the convection section. In the drawings a bank of tubes 270 is shown in the upper or cooler portion of the convection heating section 234 for heating a natural gas to an elevated temperature. This heated natural gas may be used in a gas fractionation system where dehydrators are used for removing moisture from the gaseous mixture before passing through the low temperature gas fractionation system. The heated natural gas is used for reactivating the dehydrators by removing moisture therefrom.

This invention is especially adapted for thermally cracking relatively heavy hydrocarbons to produce relatively large amounts of unsaturated lower boiling hydrocarbons such as ethylene, propylene and butadiene together with aromatic gasoline constituents. The butadiene fraction contains mostly 1, 3 butadiene. One example of the operation of the process will be now given but it is to be understood that this is by way of illustration only and that the invention is not to be restricted thereto. In this example the conditions are given for once through operation without recycling but recycling may be used if desired and is not to be excluded from this invention. A relatively heavy oil such as a highly paraffinic virgin gas oil of the East Texas type is used as the feed oil. One type of such an oil is a gas oil having a gravity of 32.3° A. P. I., an initial of 332° F., 50% off at about 680° F. and a final boiling point of about 884° F.

The gas oil is passed through the vaporizing coil 18 and is heated to a temperature of about 800° F. to 900° F., preferably about 820° F. Superheated steam at about 800 to 900° F., preferably about 820° F. is introduced into the latter passes of the vaporizing coil 18 through line 24. The steam introduced at this point is equivalent to about 8.5% by weight of the gas oil vapor leaving tower 42. An equal quantity of steam is introduced near the bottom of tower 42 through line 102. This makes a total of about 17% of steam by weight on the gas oil vapors leaving tower 42.

The vapors containing steam passing overhead from the fractionating tower 42 are at a temperature of about 775° F. to 850° F., preferably about 800° F. and these vapors and steam are passed through the conversion zone 55 wherein they are heated to a temperature of about 1200° F. to 1300° F., preferably about 1260° F. During conversion, the pressure is maintained relatively low and the pressure at the inlet of the coil 55 is about 70 pounds per square inch and at the outlet of the coil 55 is about 15 pounds per square inch. The vapors and steam remain in the conversion zone 55 for about 5.60 seconds. This time may be varied with the temperature, lower temperatures requiring longer times of reaction.

The products of conversion leaving the conversion zone 55 are mixed with a sufficient quantity of cycle gas oil introduced as quench through line 58 to reduce the temperature of the products of conversion to about 500° F. to 700° F., preferably about 600° F.

The vapors leaving the top of the fractionator 62 are at a temperature of about 220° F. to 260° F., preferably about 230° F. and after cooling in the cooler 110, they are at a temperature of about 110° F. so that substantial quantities of water are condensed in the condenser 110. The fractionator 62 is maintained under about 7 pounds per square inch. The separated vapors and liquids are then passed through the compressors and drums and the pressure in the accumulating drum 154 is about 175 pounds per square inch and the temperature is about 120° F.

The fractionating tower 174 is maintained under pressure of about 185 pounds per square inch and the vapors pass overhead through line 186 at a temperature of about 150° F. to 200° F., preferably about 163° F. The aromatic gasoline fraction withdrawn from the bottom of fractionating tower 174 contains substantial amounts of benzene, toluene, xylenes and higher aromatic fractions. This aromatic fraction corresponds to about 27.3% weight conversion of the the vaporized oil being fed through line 48 to the zone 55. The total aromatic fraction is about 28.4% by weight on the gas oil cracked. Due to the aromatic constituents, the aromatic gasoline has a high octane number. The process herein disclosed provides a method whereby at least 25% by volume of aromatic hydrocarbons are produced simultaneously wtih about 10% by weight of ethylene on the feed of hydrocarbon vapors to conversion zone 55.

The vapors fractionated in the fractionating system 202 comprise a methane-ethylene cut which is taken overhead through line 206. This fraction is a dilute ethylene fraction and may be utilized as such or may be further fractionated to separate ethylene, if desired. The second fraction withdrawn from trap-out tray 208 comprises a concentrated ethylene fraction. The total ethylene yield corresponds to about 10% by weight on the oil passing to the conversion zone 55. The propylene yield is about 10% by weight on the oil passing to the conversion zone 55. For example, if about 40,000 pounds of oil are passed through zone 55 per hour, about 4,000 pounds of ethylene will be produced per hour. When recycle cracking is used, about 15% by weight ethylene and about 15% by weight of propylene on the feed of hydrocarbons to the conversion zone 55 will be obtained.

The propylene fraction withdrawn through line 214 forms a suitable fraction for treatment in a catalytic polymerization process to produce polymerized gasoline or as a basic material for the manufacture of various chemicals. The butylene fraction withdrawn from trap-out tray 216 is preferably treated to separate butadiene therefrom, the butadiene forming about 20% to 30% of the butylene or $C_4$ fraction, by weight.

When cracking under the preferred conditions given in the example above, the following products are obtained given in weight per cent on the gas oil cracked:

| | Per cent |
|---|---|
| $H_2$ | 0.2 |
| $CH_4$ | 5.5 |
| $C_2H_4$ | 10.0 |
| $C_2H_6$ | 4.3 |
| $C_3H_6$ | 9.6 |
| $C_3H_8$ | 1.4 |
| $C_4H_6$ | 1.7 |
| $C_4H_8$ | 4.5 |
| $C_4H_{10}$ | 0.7 |
| Aromatic distillate | 28.4 |
| Cycle gas oil | 24.0 |
| Tar | 9.7 |

By varying the conditions in the above example the yield of ethylene may be raised to about 12% by weight, the yield of propylene may be raised to about 12% by weight and the yield of the butadiene fraction ($C_4H_6$) may be raised to about 2.5% by weight. The butadiene fraction contains mostly 1,3 butadiene.

While one example has been given, it is to be understood that this example is by way of illustration only and that the conditions, feed stocks, proportions, etc. may be varied without departing from the spirit of this invention.

I claim:

1. A method for cracking relatively heavy hydrocarbon liquids to produce lower boiling hydrocarbons including olefins and aromatic gasoline constituents which comprises preheating a feed stock comprising higher boiling hydrocarbons and then passing it through a vaporizing coil, preheating water and then further heating the water to produce superheated steam, introducing a portion of the superheated steam into the latter portion of said vaporizing coil for admixture with the hydrocarbons therein, passing the heated and vaporized hydrocarbons and steam to a separating zone to separate unvaporized constituents from vapors and steam, introducing another portion of the superheated steam into the bottom of said separating zone to remove volatile constituents from the unvaporized constituents, passing the separated vapors and steam from said separating zone through a conversion zone wherein they are heated to an elevated temperature to effect the desired extent of conversion, quenching the products of conversion leaving said conversion zone and passing the quenched products to a second separating zone to separate liquid residue from vapors, fractionating the vapors from said second separating zone to separate a relatively heavy condensate oil from lighter hydrocarbons, passing at least a portion of the heavy condensate oil in indirect heat exchange with the water to preheat the water, then passing the heavy condensate oil in indirect heat exchange with the feed stock to preheat the feed stock and cool the heavy condensate oil, then using at least a part of the cooled heavy condensate oil without other substantial cooling as quench in the quenching step, introducing at least another portion of the cooled heavy condensate oil without other substantial cooling into the top portion of the second separating zone as reflux to remove heavier hydrocarbons from the vapors, further treating the separated lighter hydrocarbons to separate a gasoline-containing liquid from vapors and gases and separating a hydrocarbon fraction from said vapors and gases which contains a large proportion of ethylene.

2. A method as defined in claim 1 in which another portion of the cooled heavy condensate oil is used as reflux during fractionation of the vapors leaving the second separating zone to remove higher boiling hydrocarbons from the vapors.

BROOK I. SMITH.